United States Patent

Garois

[11] Patent Number: 6,068,026

[45] Date of Patent: May 30, 2000

[54] THERMOPLASTIC-ELASTOMER COMPOSITE PRODUCT, SUCH AS A PIPE FOR CONVEYING COOLANT IN AN AIR CONDITIONING CIRCUIT, FOR EXAMPLE

[75] Inventor: Nicolas Garois, Amilly, France

[73] Assignee: Hutchinson, Paris, France

[21] Appl. No.: 09/010,441

[22] Filed: Jan. 22, 1998

[30] Foreign Application Priority Data

Feb. 5, 1997 [FR] France ................................ 97 01279

[51] Int. Cl.[7] ........................................... F16L 11/10
[52] U.S. Cl. ........................ 138/126; 138/137; 138/141; 138/146
[58] Field of Search .................. 138/124, 125, 138/126, 137, 141, 146

[56] References Cited

U.S. PATENT DOCUMENTS

| | | | |
|---|---|---|---|
| 4,421,806 | 12/1983 | Marks et al. ............... | 138/144 |
| 4,907,625 | 3/1990 | Ito et al. ................... | 138/125 |
| 4,998,564 | 3/1991 | Igarashi et al. . | |
| 5,404,915 | 4/1995 | Mügge et al. .............. | 138/137 |
| 5,474,822 | 12/1995 | Röber et al. ............... | 138/137 |
| 5,500,263 | 3/1996 | Röber et al. ............... | 138/137 |
| 5,526,848 | 6/1996 | Terashima et al. ......... | 138/125 |
| 5,554,426 | 9/1996 | Röber et al. ............... | 138/137 |
| 5,799,704 | 9/1998 | Andre ........................ | 138/137 |
| 5,803,130 | 9/1998 | Robben et al. ............. | 138/140 |
| 5,814,384 | 9/1998 | Akkapeddi et al. ........ | 138/121 |
| 5,850,855 | 12/1998 | Kerschbaumer et al. .... | 138/121 |
| 5,858,492 | 1/1999 | Roeber et al. ............. | 138/141 |

FOREIGN PATENT DOCUMENTS

| | | |
|---|---|---|
| 732384 | 9/1996 | European Pat. Off. . |
| 2689956 | 10/1993 | France . |
| 4132123 | 4/1992 | Germany . |

OTHER PUBLICATIONS

Database WPI, Section Ch, Week 9536, Derwent Publications Ltd., London, GB, JP 07 171 906, Jul. 11, 1995.

*Primary Examiner*—James Hook
*Attorney, Agent, or Firm*—Alston & Bird LLP

[57] ABSTRACT

A thermoplastic and elastomer composite product, in particular a pipe for conveying coolant fluid in a motor vehicle air conditioning circuit, the product comprising an inside layer made of a mixture of a polyamide 6 and at least one modifying agent such as a grafted poly(1,2-vinylbutadiene), a polyoctene, a brominated isobutylene-p-methylstyrene, a silane, or an ethylene and acrylic acid copolymer, and a layer of an elastomer such as a brominated butyl rubber modified by a grafted poly(1,2-vinylbutadiene), a silane, an ethylene and acrylic acid copolymer, or a copolymer of ethylene and of propylene grafted with maleic anhydride, there being total adhesion between the thermoplastic and the elastomer.

12 Claims, 1 Drawing Sheet

THERMOPLASTIC-ELASTOMER COMPOSITE PRODUCT, SUCH AS A PIPE FOR CONVEYING COOLANT IN AN AIR CONDITIONING CIRCUIT, FOR EXAMPLE

The invention relates to a thermoplastic-elastomer composite product such as a pipe for conveying coolant in the air conditioning circuit of a motor vehicle, for example.

BACKGROUND OF THE INVENTION

Such products require to comply with standards of ever-increasing severity, particularly with respect to flexibility (to reduce transmission of vibrations), their temperature behavior (inside and outside), their resistance to external agents, and where pipes are concerned, their impermeability relative to the fluid being conveyed. In addition, their lifetime must be as long as possible and their qualities of sealing and of impermeability must be maintained throughout said lifetime.

Proposals have already been made, in particular in patent application EP A-0732 384 in the name of the Applicant, to make thermoplastic-elastomer composite products in which adhesion between the thermoplastic and the elastomer is total because of modifying agents incorporated in the thermoplastic and in the elastomer, with the thermoplastic in said products acting as a strength member, as reinforcement, or as an insert, thereby making it possible, in elastomer section members in particular, to replace metal reinforcement by thermoplastic reinforcement for the purposes of reducing weight and of improving performance, while also simplifying manufacture.

Proposals have also been made on numerous occasions to make thermoplastic-elastomer composite pipes for conveying fluids in the automobile industry, which pipes generally comprise an inside layer of polyamide, an elastomer layer covering the polyamide, textile reinforcement, and an outer protective layer of rubber or of elastomer. In those known pipes, it is often necessary to make a compromise between the desired flexibility and impermeability to the fluid conveyed, and it is also necessary to interpose a thin layer of an appropriate adhesive material between the thermoplastic and the elastomer to ensure that they adhere to each other.

In the case of pipes for conveying coolant in an air conditioning circuit, it is necessary to improve the flexibility of the inside layer of polyamide while conserving its impermeability to the fluid conveyed (the CFC-containing coolants that have been used in the past are being replaced by HFCs known under the name R134a, in association with a lubricant of the polyalkylene glycol type), and proposals have been made, for example, for said inside layer to comprise a mixture of polyamide, a polyolefin modified by grafting, and of $\epsilon$-caprolactam, however that composition does not adhere to the elastomer layer covering it. In addition, the quantity of $\epsilon$-caprolactam used is a compromise between flexibility and impermeability to the fluid, with extra $\epsilon$-caprolactam improving flexibility to the detriment of impermeability.

OBJECTS AND SUMMARY OF THE INVENTION

An object of the present invention is to provide a thermoplastic-elastomer composite product with total adhesion between the thermoplastic and the elastomer, flexibility that is equal to or better than that of competing products of the prior art, together with excellent impermeability to the fluids conveyed (when the product is a pipe) and in particular to the new coolants being used in air conditioning circuits for motor vehicles.

To this end, the invention provides a composite product comprising a layer of a mixture of a thermoplastic with a modifying agent, covered in a layer of a mixture of an elastomer with a modifying agent, wherein the thermoplastic is selected from: polyamide 6; polyamide 6.6; polyamide 11; polyamide 12; polyamide 6/10; polyamide 6/12; poly(ethylene terephthalate); poly(butylene terephthalate); polypropylene; high density polyethylene; and low density polyethylene; at least one modifying agent of the thermoplastic is selected from: poly(1,2-vinylbutadiene) grafted with maleic anhydride; a polyoctene (metalocene elastomer); a brominated isobutylene-p-methylstyrene; a silane; or an ethylene and acrylic acid copolymer; the elastomer is selected from: natural rubbers; synthetic polyisoprenes; nitrile rubbers; halogenated nitrile rubber; hydrogenated nitrile rubbers; epichlorhydrine and ethylene oxide copolymers; ethylene and acrylic acid copolymers; butyl rubbers; halogenated butyl rubbers; and brominated isobutylene-p-methylstyrenes, at least one modifying agent for the elastomer being selected from poly(1,2-vinylbutadiene) grafted with maleic anhydride or hydroxylated; silanes; ethylene and acrylic acid copolymers; and copolymers of ethylene and of propylene grafted with maleic anhydride.

It has been observed that in such products, adhesion between the thermoplastic and the elastomer is total without there being any need to use an intermediate layer of adhesive, and that it is impossible to separate the layers of thermoplastic and of elastomer without destroying them.

It has also been observed that the impermeability of the product of the invention to novel coolants used in the automobile industry is better than that of the above-mentioned prior pipes comprising an inside layer formed from a mixture of polyamide 6, a copolymer of ethylene and of propylene grafted with maleic anhydride, and of $\epsilon$-caprolactam, while the flexibility of products of the invention is at least equal to or better than that of prior pipes.

The concentrations of modifying agents in the thermoplastic and in the elastomer can vary over a very wide range and, in general, lie in the range about 1% to about 50%.

The elastomer and the thermoplastic used may also include fillers, whether organic or inorganic, together with plasticizers.

The invention also provides a pipe for conveying a coolant fluid in an air conditioning circuit of a motor vehicle, the pipe comprising an inside layer of thermoplastic and an elastomer layer as described above, and in which the thickness of the inside layer of thermoplastic lies in the range about 0.1 mm to about 2 mm, and the thickness of the elastomer layer lies in the range about 0.2 mm to about 3 mm.

Such a pipe also comprises a textile reinforcing layer covering the elastomer layer and itself covered by a protective layer made of elastomer.

A thin elastomer layer may also be provided on the inside face of the thermoplastic layer in order to improve sealing where the pipe is mounted on a connection end fitting.

In a preferred embodiment of the invention, the above-specified thermoplastic is a mixture of polyamide 6, of caprolactam, of a silane, and of at least one component selected from a terpolymer of ethylene, of acrylic acid, and of acrylate, and a halogenated butyl rubber, such as a bromo-butyl rubber, for example.

BRIEF DESCRIPTION OF THE DRAWING

The invention will be better understood and other characteristics, details, and advantages thereof will appear more clearly on reading the following description given by way of example and with reference to the accompanying drawing, in which.

MORE DETAILED DESCRIPTION

Figure 1:
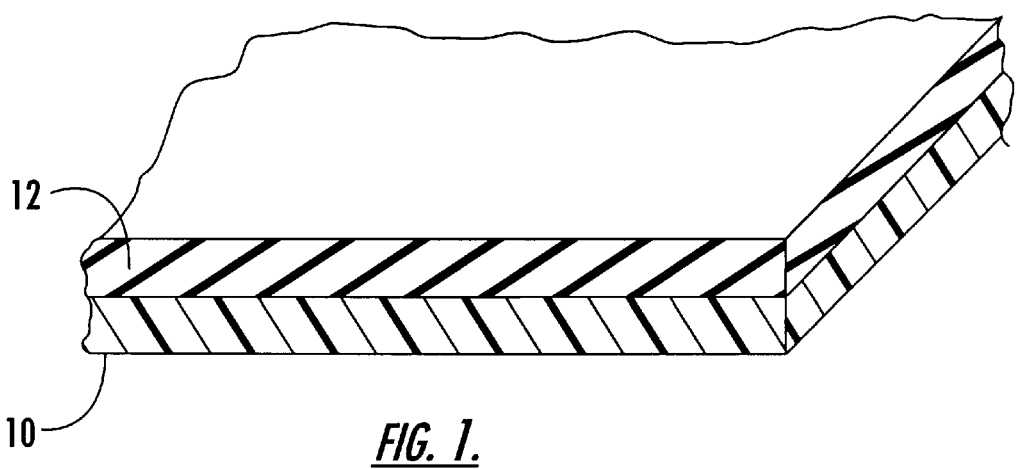
FIG. 1 is a fragmentary diagrammatic section view of a composite product of the invention.

The composite product of the invention as shown diagrammatically in FIG. 1 comprises a layer 10 of thermoplastic covered in a layer 12 of elastomer, with adhesion between the two layers being such that any attempt at separating them causes one or both of the layers to be destroyed.

The thermoplastic of the layer 10 can be selected from the following compounds: PA 6, PA 6.6, PA 11, PA 12, PA 6/10, PA 6/12, PET, PBT, PP, HDPE, and LDPE, mixed with at least one of the following modifying agents:

poly(1,2-vinylbutadiene) grafted with maleic anhydride, polyoctene (metalocene elastomer), brominated isobutylene-p-methylstyrene, silanes, and ethylene and acrylic acid copolymers. A plurality of these modifying agents can be added to the above-mentioned thermoplastic.

The quantity of modifying agent in the thermoplastic can vary in the range about 1% to 50% by weight.

The layer 12 of elastomer is based on an elastomer selected from the following compounds: NR, IR, NBR, XNBR, HNBR, ECO, ethylene and acrylic acid copolymers, butyl rubbers, halogenated butyl rubbers, and brominated isobutylene-p-methylstyrene, with at least one of the following modifying agents being added thereto: poly(1,2-vinylbutadiene) grafted with maleic anhydride or hydroxylated, silanes, ethylene and acrylic acid copolymers, and copolymers of ethylene and of propylene grafted with maleic anhydride.

A plurality of the modifying agents can be added to the elastomer, to a concentration lying in the range 1% to 50% by weight.

Figure 2:
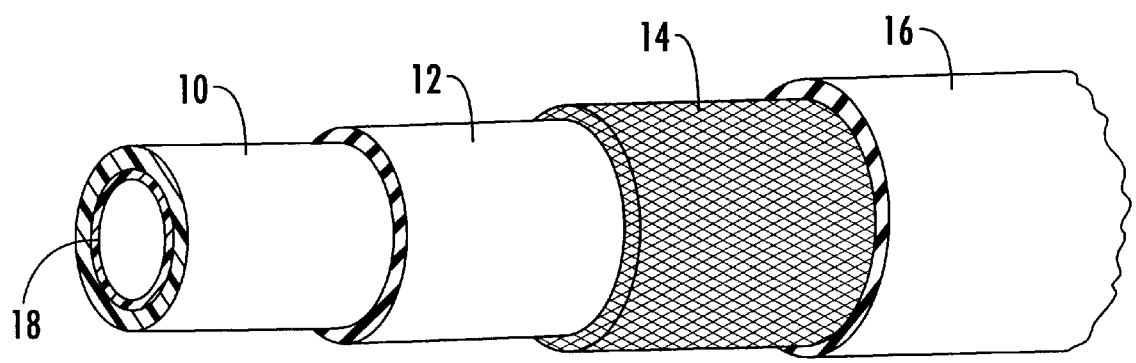
FIG. 2 is a fragmentary diagrammatic view in perspective of a pipe of the invention.

The pipe shown diagrammatically in FIG. 2 is for conveying a coolant fluid of the HFC type as used in motor vehicle air conditioning circuits, and it comprises an inside layer 10 of thermoplastic having the same composition as the layer 10 of FIG. 1, a layer 12 of elastomer surrounding the layer 10 of thermoplastic and having the composition of the layer 12 in FIG. 1, textile reinforcement 14 surrounding the elastomer layer 12, said textile reinforcements possibly being a braid of polyester threads, of polyamide threads, etc. . . . , and a protective layer 16 made out of a suitable elastomer which may be of the same type as that used for the layer 12, or which may be different.

Typically, the thickness of the inside layer 10 based on thermoplastic is of the order of 0.1 mm to 0.3 mm, and the thickness of the layer 12 based on elastomer is about 0.5 mm to about 2 mm.

A thin layer 18 of elastomer may cover the inside surface of the layer 10 based on thermoplastic in order to improve sealing when the pipe is mounted on a connection endpiece, or the like.

By way of example, the compositions of the layers 10 and 12 of the pipe in FIG. 2 may be as follows:

| Layer 10 | |
| --- | --- |
| PA6 | 78 parts by weight |
| silane | 2 parts by weight |
| plasticizer | 20 parts by weight |
| or | |
| PA6 | 75 parts by weight |
| grafted poly(1,2-vinylbutadiene) | 20 parts by weight |
| plasticizer | 5 parts by weight |
| Layer 12 | |
| brominated butyl rubber | 100 parts by weight |
| carbon black | 80 parts by weight |
| peroxide | 8 parts by weight |
| coagent | 3 parts by weight |
| silane | 5 parts by weight |

It is also possible to associate a layer 12 based on modified brominated butyl rubber as mentioned above with a layer 10 of polyamide 6 modified by an ethylene and acrylic acid copolymer and by a silane, and also containing a plasticizer.

The layer 12 of modified brominated butyl rubber may also be associated with a layer 10 of thermoplastic comprising a polyamide 6 modified by isobutylene-p-methylstyrene, by polypropylene, a silane, and a plasticizer.

In particular, and in a preferred embodiment of the invention, the thermoplastic of the inside layer 10 may have one of the following compositions:

PA 6 (65%)+terpolymer of ethylene, of acrylate, and of acrylic acid (25%)+caprolactam (8%)+silane (2%);

PA 6 (65%)+bromobutyl rubber (25%)+caprolactam (8%)+silane (2%); and

PA 6 (65%)+a mixture of ethylene, acrylate, and acrylic acid terpolymer with halogenated butyl rubber (25%)+ caprolactam (8%)+silane (2%).

The percentages given above are percentages by weight.

The polyamide 6 modified as described above has permeability to HFC coolant fluids (R 134 a) lying in the range $1 \times 10^{-8}$ to $2 \times 10^{-8}$ cm$^3$.mm/Pa.s.m$^2$, and bending moduluses lying in the range about 300 MPa to about 600 MPa.

What is claimed is:

1. A composite product comprising a layer of a mixture of a thermoplastic with a modifying agent, covered in a layer of a mixture of an elastomer with a modifying agent, wherein:

the thermoplastic is selected from: polyamide 6; polyamide 6.6; polyamide 11; polyamide 12; polyamide 6/10; polyamide 6/12; poly(ethylene terephthalate); poly(butylene terephthalate); polypropylene; high density polyethylene; and low density polyethylene;

at least one modifying agent of the thermoplastic is selected from: poly(1,2-vinylbutadiene) grafted with maleic anhydride; a polyoctene (metalocene elastomer); a brominated isobutylene-p-methylstyrene; a silane; or an ethylene and acrylic acid copolymer;

the elastomer is selected from: natural rubbers; synthetic polyisoprenes; nitrile rubbers; halogenated nitrile rubber; hydrogenated nitrile rubbers; epichlorhydrine and ethylene oxide copolymers; ethylene and acrylic acid copolymers; butyl rubbers; halogenated butyl rubbers; and brominated isobutylene-p-methylstyrenes;

at least one modifying agent for the elastomer being selected from poly(1,2-vinylbutadiene) grafted with maleic anhydride or hydroxylated; and ethylene and acrylic acid copolymers.

2. A product according to claim 1, wherein the proportion of modifying agent in the thermoplastic or in the elastomer lies in the range about 1% to about 50% by weight.

3. A product according to claim 1, wherein the thermoplastic and/or the elastomer include a plurality of the above-mentioned modifying agents.

4. A product according to claim 1, wherein the elastomer and/or the thermoplastic include plasticizers and/or organic or inorganic fillers.

5. A pipe for conveying cooling fluid in a motor vehicle air conditioning circuit, the pipe comprising an inside layer of thermoplastic covered in a layer of elastomer, said layers having the compositions specified in claim 1, wherein the thickness of the thermoplastic layer is about 0.1 mm to 2 mm and the thickness of the elastomer layer is about 0.2 mm to 3 mm.

6. A pipe according to claim 5, wherein the elastomer layer is covered in a textile reinforcing layer and in a protective layer.

7. A pipe according to claim 5, also including a thin elastomer layer on the inside face of the thermoplastic layer.

8. A pipe according to claim 5, wherein the thermoplastic of the inside layer is a mixture of polyamide 6, of ethylene and acrylic acid copolymer, of silane, and of plasticizer, or a mixture of polyamide 6, of isobutylene-p-methylstyrene, of polypropylene, of silane, and of plasticizer, the elastomer of the layer covering the thermoplastic being based on bromobutyl rubber.

9. A pipe according to claim 5, wherein the above-specified thermoplastic is a mixture of polyamide 6, of caprolactam, of a silane, and of at least one component selected from a terpolymer of ethylene, of acrylic acid, and of acrylate, and a halogenated butyl rubber.

10. A composite product comprising a layer of a mixture of a thermoplastic with a modifying agent, covered in a layer of a mixture of an elastomer with a modifying agent, wherein:

the thermoplastic is selected from: polyamide 6; polyamide 6.6; polyamide 11; polyamide 12; polyamide 6/10; polyamide 6/12; poly(ethylene terephthalate); poly(butylene terephthalate); polypropylene; high density polyethylene; low density polyethylene;

at least one modifying agent of the thermoplastic is selected from: poly(1,2-vinylbutadiene) grafted with maleic anhydride; a polyoctene (metalocene elastomer); a brominated isobutylene-p-methylstyrene; and a silane;

the elastomer is selected from: natural rubbers; synthetic polyisoprenes; nitrile rubbers; halogenated nitrile rubbers; hydrogenated nitrile rubbers; epichlorhydrine and ethylene oxide copolymers; ethylene and acrylic acid copolymers; butyl rubbers; halogenated butyl rubbers; and brominated isobutylene-p-methylstyrenes;

at least one of the modifying agent for the elastomer being selected from poly(1,2-vinylbutadiene) grafted with maleic anhydride or hydroxylated; and ethylene and acrylic acid copolymers.

11. A composite product comprising a layer of a mixture of a thermoplastic with a modifying agent, covered in a layer of a mixture of an elastomer with a modifying agent, wherein:

the thermoplastic is selected from: polyamide 6; polyamide 6.6; polyamide 11; polyamide 12; polyamide 6/10; polyamide 6/12; poly(ethylene terephthalate); poly(butylene terephthalate); polypropylene; high density polyethylene; low density polyethylene;

at least one modifying agent of the thermoplastic is selected from: poly(1,2-vinylbutadiene) grafted with maleic anhydride; a polyoctene (metalocene elastomer); a brominated isobutylene-p-methylstyrene; and an ethylene and acrylic acid copolymer;

the elastomer is selected from: natural rubbers; synthetic polyisoprenes; nitrile rubbers; halogenated nitrile rubbers; hydrogenated nitrile rubbers; epichlorhydrine and ethylene oxide copolymers; ethylene and acrylic acid copolymers; butyl rubbers; halogenated butyl rubbers; and brominated isobutylene-p-methylstyrenes;

at least one of the modifying agent for the elastomer being selected from poly(1,2-vinylbutadiene) grafted with maleic anhydride or hydroxylated; silanes; ethylene and acrylic acid copolymers; and copolymers of ethylene and propylene grafted with maleic anhydride.

12. A composite product according to claim 11, wherein the inside layer of thermoplastic is made of polyamide 6 including a poly(1,2-vinylbutadiene) grafted with maleic anhydride and the elastomer of the layer covering the thermoplastic is a bromobutyl rubber modified by a silane.

* * * * *